May 23, 1950 M. MAESER 2,508,577
DEVICE FOR TESTING THE CONTROL MECHANISM
OF FUSE SETTERS AND RAMMERS FOR GUNS
Filed Feb. 5, 1945 6 Sheets-Sheet 1

Fig. 2

Inventor
Mieth Maeser
By his Attorney

Inventor
Mieth Maeser
By his Attorney

Fig. 7

Patented May 23, 1950

2,508,577

UNITED STATES PATENT OFFICE 2,508,577

DEVICE FOR TESTING THE CONTROL MECHANISM OF FUSE SETTERS AND RAMMERS FOR GUNS

Mieth Maeser, Beverly, Mass., assignor to United Shoe Machinery Corporation, Flemington, N. J., a corporation of New Jersey Application February 5, 1945, Serial No. 576,233

10 Claims. (Cl. 73—167)

This invention relates to testing devices, and is herein illustrated as embodied in a device for testing by recurrent trial a control mechanism utilized in a fuse-setting and ramming device for antiaircraft guns.

When manufacturing mechanisms which involve driven shafts provided with clutches and arranged to be operated in a definite cycle, it has been found necessary to subject such mechanisms to a thorough testing in order to insure their proper operation when in actual use. This requires that the cycle of operations of such mechanisms or devices shall be repeated a sufficient number of times so that the parts of the mechanism are brought, by the wear incident to such testing, into their best operating condition where thereafter the cycle can be repeated many times without need for adjustment of the parts. In some such mechanisms, it may be necessary to operate them cyclically several thousand times before the above-mentioned condition is reached. If, in order to provide such a running in of the control mechanism it were necessary to operate the whole machine or, in the illustrated case, the fuse-setting and ramming mechanism of a gun, there would be an unnecessary amount of wear on the machine or, in this case, the fuse-setting and ramming device as well as the gun itself.

Accordingly, an object of the invention is to provide a testing device of the type indicated which may be applied to such mechanisms to simulate the action of the parts which are controlled.

As herein illustrated and in accordance with features of the invention, a brake load is provided for the clutch shaft of the control mechanism to be tested and means, such as a power-operated cam, are provided for applying the brake load intermittently in timed relation to a movement of a principal part of the testing device which simulates some action, such as the illustrated recoil of the gun.

These and other features of the invention will best be understood from a consideration of the following specification taken in connection with the accompanying drawings, in which.

Figure 3:
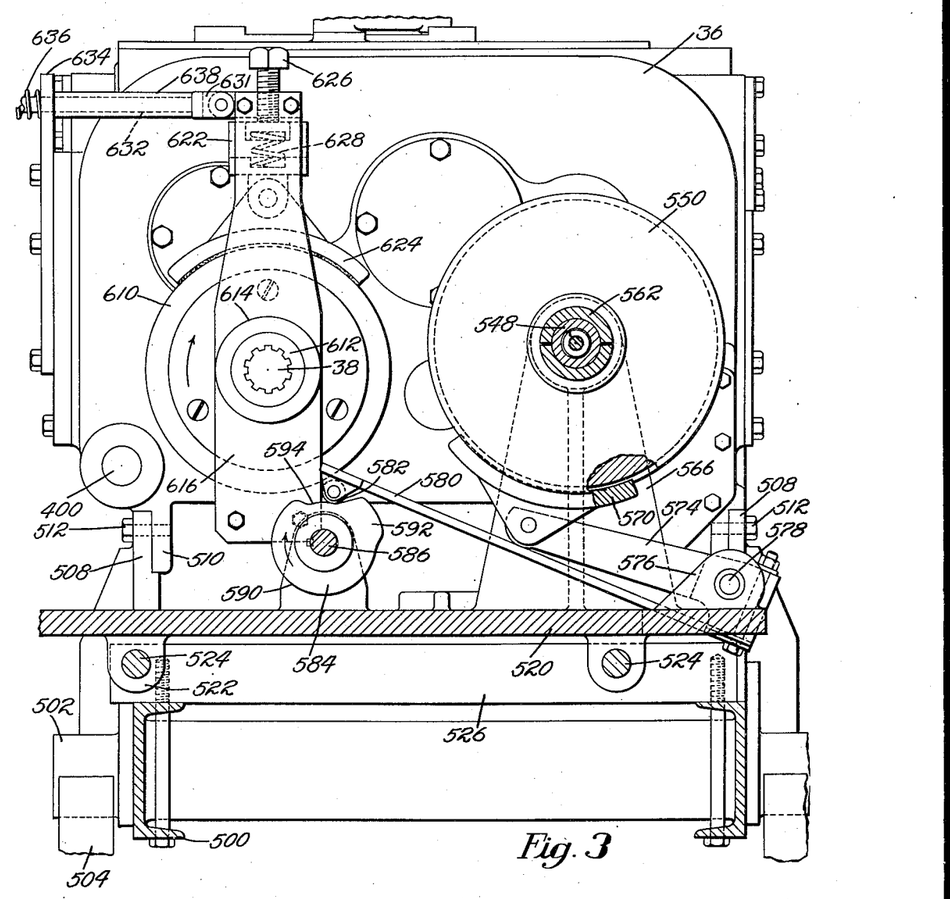
Fig. 3 is a transverse vertical section on the line III—III of Fig. 1.
Figure 4:
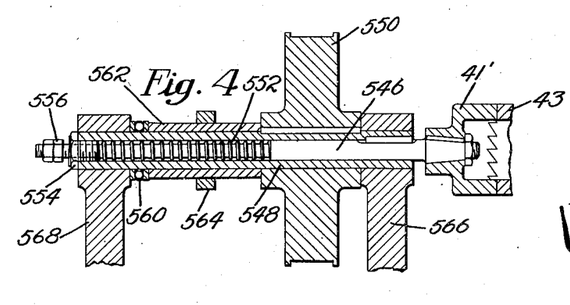
Fig. 4 is a longitudinal section through a clutch shaft on the line IV—IV of Fig. 2.
Figure 5:
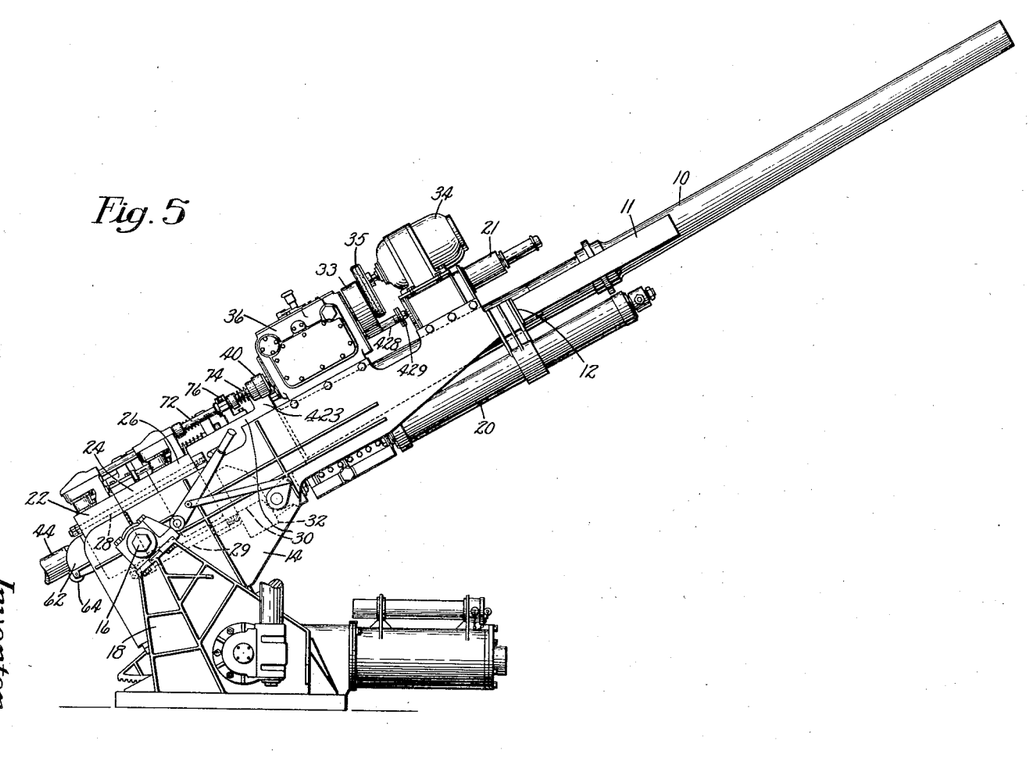
Fig. 5 is a side elevation of the gun on its carriage, showing the relation thereto of the motor, the control box and the fuse-setting and ramming mechanisms.
Figure 6:
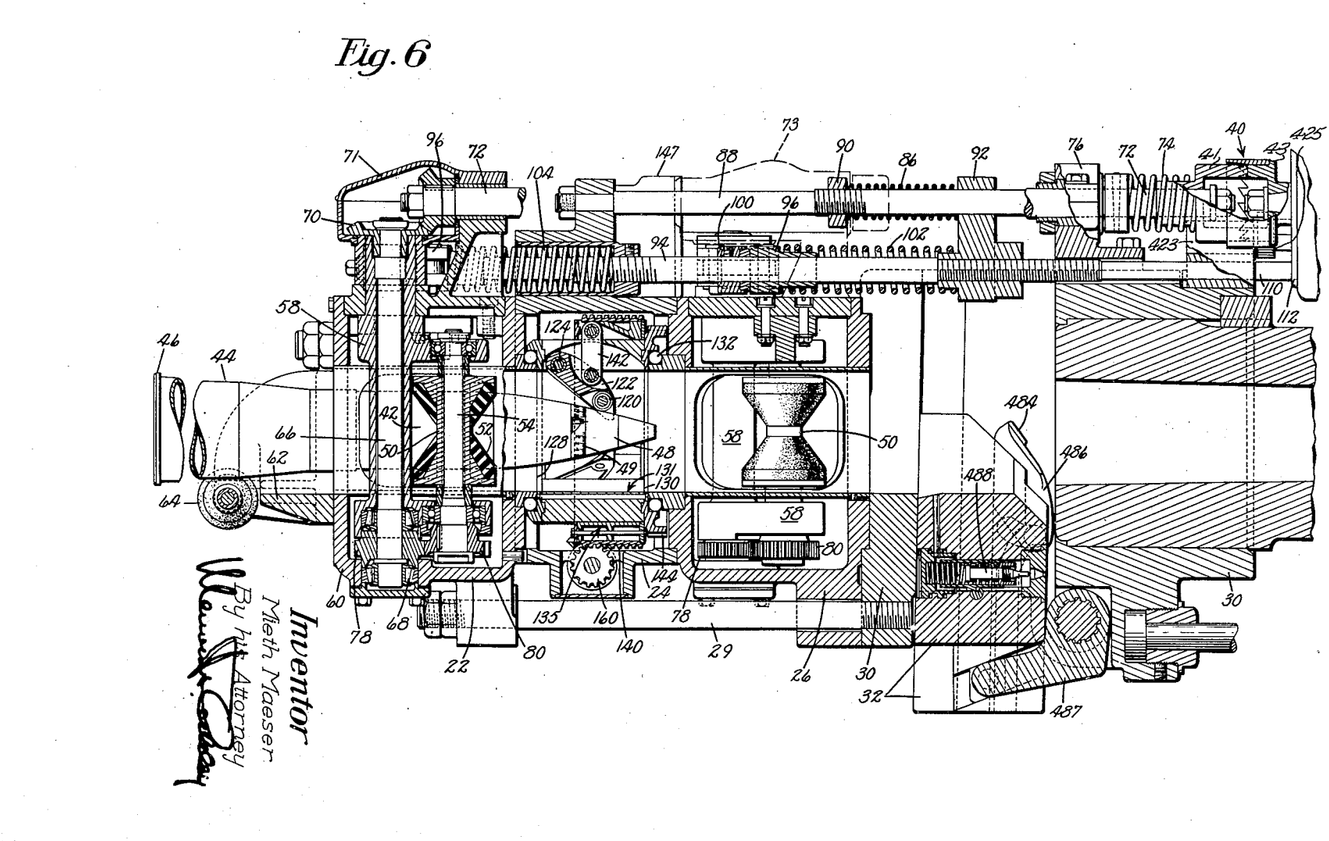
Fig. 6 is a vertical section through the breech end of the gun and through the ramming and fuse-setting mechanisms.

A better understanding of the testing device, shown in Figs. 1 to 4, inclusive, may be had from a consideration of the utility of the control box mechanisms in its association with the fuse-setting and ramming mechanisms. The latter are shown in Figs. 5 and 6 as applied to an antiaircraft gun 10 (Fig. 5) slidably supported by rails 11 riding in guides 12 forming a part of a cradle 14 which is carried by trunnions 16 upon a suitable support 18. Recoil cylinders 20 and a counter-recoil cylinder 21 are secured to the cradle. The ramming and fuse-setting mechanism comprises sectional castings 22, 24 and 26 which are supported by means of bolts 28, 29 upon the breech ring 30, and this latter is provided with guides for a vertically slidable breechblock 32 (Fig. 6). Power is supplied to these mechanisms from an electric motor 34 by belts 35, through a flywheel 33 to a control box 36, both supported upon the cradle, and is transmitted to the fuse-setting mechanism through a coupler 38 (Fig. 7) and to the ramming mechanism through a separable dog clutch 40. When the gun recoils, the fuse-setting and ramming mechanisms move with it, while the motor and the control box remain fixed upon the cradle 14.

Ramming mechanism

The ammunition is delivered to such a gun in the form of an assembled round (Fig. 6) comprising a shell 42 and an associated cartridge case 44 which has the usual flange 46. The shell may be provided with a time fuse having a rotatable setting ring 48 associated with graduations 49. The setting of the fuse is effected, as later described, while the round is positioned in alinement with the gun barrel, as the ammunition is being presented to the gun and, immediately thereafter, the round is passed into the gun barrel, whereupon the breechblock is closed and the gun fired.

The ramming mechanism herein illustrated is provided with two pairs of feed rolls 50 each of which comprises opposed frusto-conical surfaces of resilient material 52. Each feed roll is provided with a shaft 54 (Fig. 6) mounted in suitable bearings in the arms of a swinging carrier 56, The cooperating rolls 50 of a pair are swung into engagement with the periphery of the round and are yieldable, in a manner to be described, so that they may cooperate with the varying diameters of the round as it moves into the gun. A cover plate 60 secured to the sectional casting 22 provides a support for a bracket 62 on which are carried idle rolls 64 which assist in centering the round as it is presented to the ramming mechanism. Each feed roll carrier 58, as shown in Fig. 6, swings on a jack shaft 66. Each shaft 66 is supported upon a bearing 68, and those at the right side of the rammer have at their upper ends bevel gears 70 within housings 71 and 73 meshing with similar gears on a drive shaft 72 at the forward end of which is one half 41 of the clutch 40, this half being splined to the shaft and capable of yielding against a spring 74 (Fig. 6). The shaft 72 is carried in bearings provided by the sections 22 and 26 and by a lug 76 on the breech ring 30. At its lower end, each jack shaft 66 has a pinion 78 meshing with a pinion 80 on the roll shaft, thereby to drive the roll. The pinions 78 on opposite sides of the rammer are interconnected. By this arrangement, the supply of power to the cooperating rolls of a set is independent of the positions of the carriers, and it will later be shown that, after firing the gun, these carriers are swung aside to provide a free passage for the expulsion of the cartridge case 44. Inasmuch as the feed roll elements contained within the forward section 26 are identical with those already described, no further description will be given of these parts, and the same numerals will be applied thereto.

Figure 2:
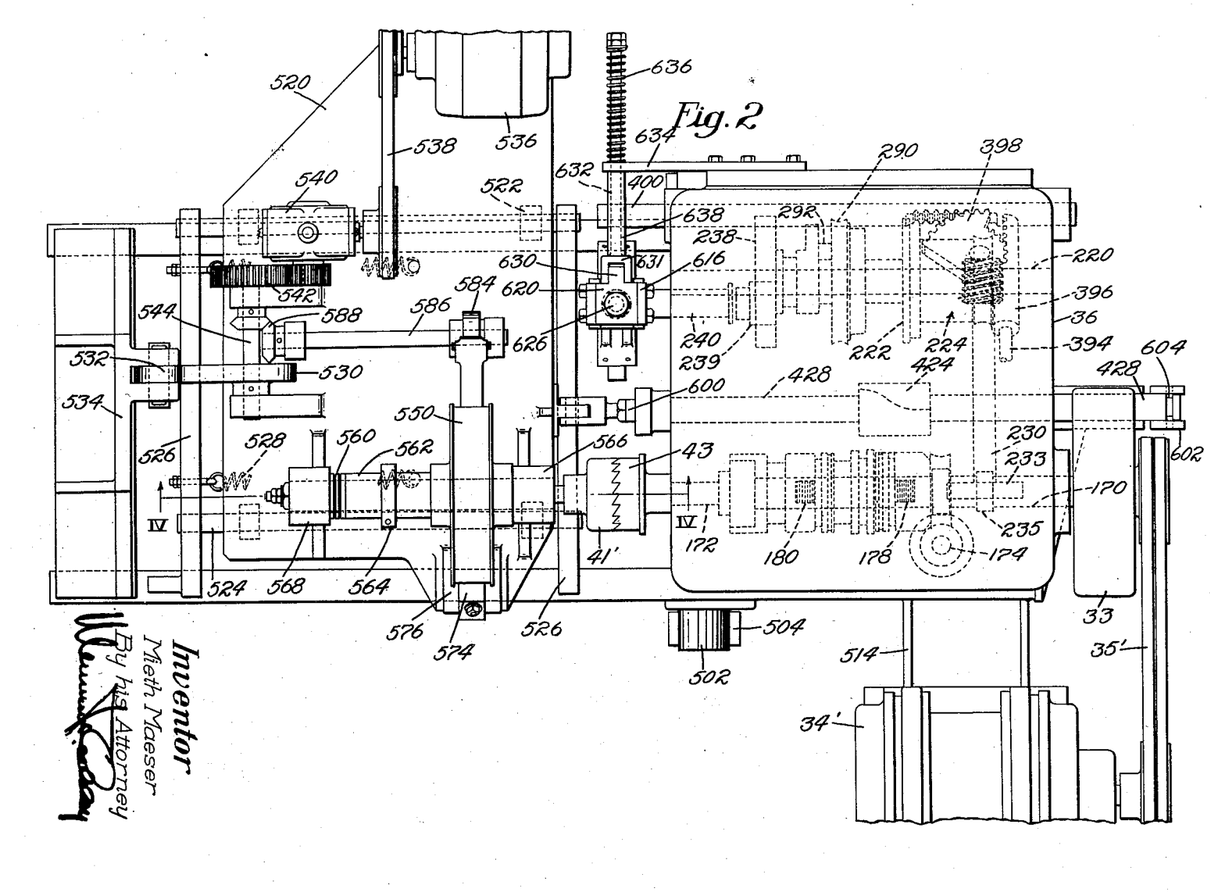
Fig. 2 is a plan view of the same.

Separation of the feed roll carriers is effected by a spring 86 (Fig. 6) surrounding a rod 88 and bearing at one end against a collar 90 secured to the rod and at its forward end against a block 92. This block is slidable on the rod 88 and has its lower end threaded to a rod 94 which is yieldably connected to the feed roll carriers. This yieldable connection is effected by coil springs 102 and 104 abutting yokes 96, joined to the carriers. The reduced forward end 110 of the rod 94 is supported in a lug 423 on the breech ring and is positioned for engagement with an abutment 112 formed on the control box 36. Accordingly, when the gun is in battery position, as shown in Fig. 2, this rod 94 is pushed back to compress the springs 102 and 104, thereby to hold the feed rolls 50 resiliently against the sides of the round of ammunition and accommodating variations in diameter from point to base. Upon recoil, the already compressed spring 86 expands and, acting through the block 92, moves the rod 94 forward to swing the feed roll carriers out to a position where there is sufficient space to permit a free passage of the expelled cartridge case 44.

*Fuse-setting mechanism*

The parts of the fuse-setting mechanism which grasp the fuse-setting ring 48 of the shell are contained within the sectional casting 24. Firm engagement of the mechanism with the ring 48 is effected by sharp-edged disks 120 (Fig. 6) mounted in a trio of jaws 122 which are pivotally carried on pins 124 extending between arcuate portions which, with the side plates 128 and 130, go to make up a rotatable cage 131 mounted on ball bearings 132 for rotation around the axis of the gun. The side plates are frictionally held in clamping engagement with the arcuate portions by means of transverse bolts (not shown). The outer surface of the cage is cylindrical and supports a sliding ring 135. An annular sleeve 140 surrounds and tightly frictionally engages the ring 135 and has, on its outer surface, parallel peripheral grooves which constitute a rack enabling the ring to be moved along the axis of the gun from one end to the other of the cage 131 in a manner to be described. Extending between the ring 135 and the jaws 122 are links 142 which, when the ring 135 is forward, as in Fig. 6, extend substantially radially and hold the disks 120 in firm engagement with the fuse ring 48. When, on the other hand, the ring 135 is slid to the rear, these arms 142 are drawn into recesses provided in the cage so that they are completely out of the path of the cartridge case 44 as it moves into the gun or when it is expelled after firing.

Fractional rotation of the cage 131 around the axis of the gun to set the fuse ring 48 is effected by power delivered to an annular gear 144 formed on the side plate 130. This gear is driven indirectly by an operating shaft (not shown) for the fuse setter which carries part of the coupler 38 (Fig. 7) and receives power through the control box 36 at appropriate times. For sliding the ring 135 upon the cage to move the arms 122 in and out, power is received from a sliding rack (not shown), mounted on a rod carried by a bracket on the section 26 and which is alined with a rod 400 (Figs. 2 and 7) in the control box 36.

*Motor drive*

Power is supplied from the motor 34 (Fig. 5) which is connected by belts 35 to a drive shaft 170 (Fig. 7) contained within the control box 36 and driven (a) to rotate the feed rolls, thereby to carry the shell into engagement with the fuse-setter jaws, (b) to turn the fuse setter, thereby to set the fuse in accordance with data received from a director, (c) to then move the jaws out of the way, and (d) to drive the feed rolls at a higher speed, thereby to carry the shell into the gun. The breech is then closed automatically and the gun fired as desired, either automatically (not shown) or manually (not shown). Closure of the breechblock is effected automatically when the flange 46 upon the round of ammunition engages the arms 484 (Fig. 6) of an extractor 486 which is pivoted in the breechblock 32. The consequent rocking of this extractor clockwise moves its trunnions from the locking position which is illustrated, along the grooves shown in dotted lines, to a release position so that a spring (not shown) acting through an arm 487 will raise the breechblock into position to close the rear end of the barrel of the gun ready for firing.

*Control mechanism*

Figure 7:
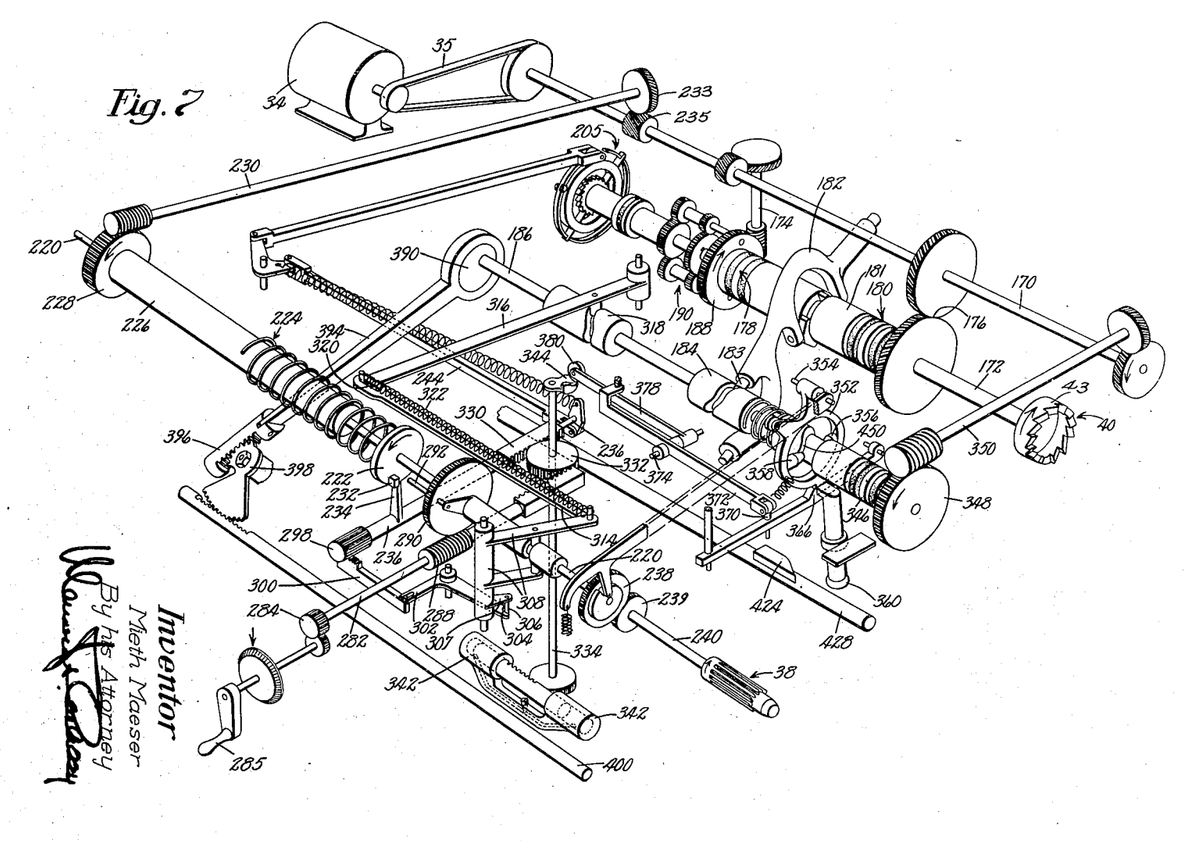
Fig. 7 is a schematic view of the mechanism contained within the control box and by means of which the sequence of events in firing the gun is determined.

To determine the setting of the fuse and to control the sequence of operations, a transmission or control mechanism, shown diagrammatically in Fig. 7, is provided within the control box 36. In this control mechanism, the power of the motor 34 supplied to the drive shaft 170 is transmitted to a subjacent clutch shaft 172 through either a low-speed connection comprising a countershaft 174, or through a high-speed connection embodying gears 176, depending upon which one of the clutches 178 or 180 is closed by the action of a sleeve 181 splined to the shaft 172 and moved by a speed shipper 182. This shipper has a cam roll 183 engaging the track of a cam 184 on a cam shaft 186. The clutch shaft 172 is provided at its rear end (the near end in Fig. 7) with one part 43 of the dog clutch 40 by means of which power is transmitted to the feed rolls. Also supported on the shaft 172 is a worm gear 188 meshing with a worm on the countershaft 174 and comprising a part of the low-speed drive as well as a part of a differential 190.

This and other mechanism is contained in the control box 36 and the utility thereof will now be briefly described by a recitation of the sequence of operations of the ramming and fuse-setting devices in a cycle determined by this control mechanism. When the gun is ready for use, it is in battery position with the breechblock lowered, the fuse-setter jaws closed and the feed roll brackets swung in so that the rolls are ready to engage a shell. At that time, also, a data pin 292 carried in a worm gear 290 which is rotatable freely on a shaft 220 will have been set manually in accordance with the range by means of a crank 285 operating through gears 284 to turn a shaft 282 having a worm 288 which engages the worm gear 290. A round is then presented to the gun, being entered between the feed rolls under the guidance of the supporting roll 64 at the rear end, whereupon it will be seized by the first set of feed rolls which are rotating at a low speed, of the order of 150 R. P. M. As soon as the shell strikes and is stopped by the fuse-setting jaws, the feed rolls stall, slipping the clutch 178 and causing the differential 190 to operate to initiate the cycle of the control mechanism. This serves to turn an over-riding clutch 205 counterclockwise as viewed in Fig. 7, thereby through connecting links and levers to turn a shaft 236 which acts through a pinion 298, a rack 300 and a bell crank 302 to release a pin 306, carried by arm 307, from a notch 304, thus allowing a shipper 308 to be actuated by a spring 322 to thrust the data pin 292 forward where it will be in a position to determine the extent of fractional revolution of the fuse setter. Substantially simultaneously a zero stop lug 234 is disengaged from a shoulder 232 on a fuse-clutch-release plate, or controller, 222 mounted on and connected to the shaft 220. A wrap-around spring clutch 224 which receives energy from the drive shaft 170 through gears 233, 235, a shaft 230 and a worm and gear 228 connected to a sleeve 226 of this clutch 224 then is able to turn the controller 222 counterclockwise until the shoulder 232 contacts the data pin 292. In this turning movement of the controller 222 with the clutch 224, the shaft 220 will be fractionally rotated also and, through gears 238, 239, a shaft 240, the coupling 38 and an operating shaft (not shown) which is interposed between the coupling and the annular gear 144 (Fig. 6), will set the fuse. When the shoulder 232 bangs against this data pin 292, it turns the input-data worm gear 290 slightly, sliding the data shaft 282 sufficiently (about a half inch) to turn a vertical shaft 334 and, by a cam 344, to unlatch an escapement.

This escapement mechanism is associated with the cam shaft 186 which has a friction clutch 346 which receives power from the drive shaft 170 through a shaft 350 and a worm-and-gear connection 348. The escapement includes a ring-like pendulum 352 pivoted at 354 and carrying tapered cam rolls 356 and 358. A spring secured to the pendulum tends to draw it to the left as seen in Fig. 7 but is prevented by a latch 366 normally held upwardly by a spring (not shown) and capable of being depressed by a trigger pin 370 mounted at one end of a jointed lever 372, 378. The latter, which is pivoted at 374, has at its other end a roll 380 engaging the top of the cam 344. As the pendulum swings one way or another, the rolls 356 and 358 cooperate with a cam 450 to permit rotation of the cam shaft 186 for a half revolution and then to open the friction clutch 346. When, as previously described, the cam 344 is rotated, the latch 366 will be released, whereupon the cam shaft 186 turns through a half revolution and the speed shipper 182 opens the low-speed driving clutch 178 and closes the high-speed driving clutch 180 so that the feed rolls turn at higher speed, such as 1100 R. P. M. At the same time, the action of the cam 318, which is on the cam shaft, acting through a lever 316 connected by a link 314, having a slot 320, and by a spring 322 with the shipper 308, will be to pull the data pin 292 out of engagement with the controller shoulder 232. An eccentric 390 on the cam shaft 186, acting through a pitman 394, a rack 396 and a double segment 398, will push out a rod 400 to draw out the fuse-setting jaws and to release the shell. As soon as the data pin 292 is pulled aside, the fuse-clutch-release plate, or controller, 222 will be free to turn until the shoulder 232 comes back to its starting position in engagement with the zero stop lug 234. This will react through the shaft 236, a rack 330 and a gear 332 to return the worm 288, and hence the data pin 292, to its predetermined position. This movement is retarded by the action of a dashpot 342.

The fuse-setter jaws having been withdrawn and the feed rolls driven at high speed, the round is carried forward into the gun. In so doing, the breechblock will be closed, as described heretofore. The firing pin 488 (Fig. 6) may then be operated and, as the shot is fired, the gun will start to recoil. This will disengage the clutch 40 which drives the feed rolls, thereby allowing them to slow down and, at the same time, the spring 86 will be effective to swing the feed rolls open.

As soon as the gun starts to recoil, a spring within the counter-recoil-buffer cylinder 21 (Fig. 5) expels the counter-recoil-buffer rod 428, whereupon the movement of the block cam 424 on this rod will be effective to strike a roll 360 and to reset the escapement pendulum 352 which will be held in the position shown in Fig. 7 by the latch 366. This will cause the cam shaft to turn through a second half revolution, operating the speed shipper to close the low-speed drive clutch 178. Also, cam 318 will withdraw link 314 to allow latch 302 to return behind pin 306, thus leaving data pin 292 withdrawn from the path of stop 232 and ready to be released when latch 302 is again withdrawn.

During counter-recoil, the breechblock will open and the empty case will be ejected, passing back between the then separated fuse-setter jaws and feed rolls. Then, at the end of counter-recoil, the fuse-setter jaws will be closed by the engagement of a rod (not shown) with the projecting rod 400. Similarly, rod 94 of the ramming mechanism will strike the abutment 112 on the control box 36, and the ramming rolls will be moved inwardly to operative position, turning at low speed as the parts of clutch 40 re-engage.

From the above description, it will be seen that the control box 36 includes a mass of mechanism including various clutches and, if this mechanism is to serve its purpose under the exigencies of use of the gun in the field, it must operate perfectly without need for repeated adjustment. I have, therefore, provided a device for testing it by running it in without the necessity of operating the gun for that purpose. This testing device, shown in Figs. 1 to 4, embodies a table 500 in the form of an open frame made of channel iron and is tiltable by means of trunnions 502 upon supporting legs 504 so that the position of the control box which is carried thereby may be adjusted by means of a shiftable brace 506 to simulate various degrees of elevation of the gun with the resultant variation of the effect of gravity upon the parts of the control mechanism. This table is provided with vertical flanges 508 (Fig. 3) to which depending flanges 510 of the control box are secured by screws 512 during the test. Attached to one side of this table 500 is a lateral bracket 514 upon which there may be mounted a drive motor 34' corresponding to the motor 34 of the gun mount, and this may be connected by V-belts 35' to the drive shaft 170 of the control mechanism on which the flywheel 33 is mounted. During the test, this motor is run continuously.

On the table, a slidable platform 520 is guided for reciprocation by the engagement of lugs 522 on the platform with rods 524 which are supported in cross braces 526 extending up from the table 500. This platform is arranged to be drawn to the left as seen in Fig. 1 by means of a spring 528 and to be pushed forward toward the control box 36 by the engagement of a recoil cam 530 with a roll 532 mounted on an abutment 534 fastened to the end of the table 500.

The platform 520 also carries a motor 536 (Fig. 2) driven continuously during the test and connected by a belt 538 to a speed-reducing mechanism 540 and thence by gears 542 to a cam shaft 544 on which there is secured the recoil cam 530. Rotation of this cam, held against the roll 532 by the spring 528, causes a reciprocatory movement of the platform 520 which simulates the recoil of the gun. This movement of the platform draws a clutch part 41' away from the coacting part 43 on the control box or, when the platform is in the position shown in Fig. 1, causes it to engage that clutch part as if the gun were in battery. This clutch part 41', as shown in detail in Fig. 4, is keyed to the end of a shaft 546 which in turn is slidably splined to a surrounding sleeve 548 carrying a brake drum 550. The shaft 546 has a reduced portion which is surrounded by a spring 552 normally urging the clutch part 41' to the right in Fig. 1 but capable of yielding upon engagement of said part 41' with the clutch part 43 of the control box. This spring is compressed between a shoulder on the shaft and a threaded abutment sleeve 554, and movement of the shaft to the right is limited by lock nuts 556. The construction permits proper engagement of the teeth of the clutch in case the tops of these teeth come together first and then are forced to slip into operative engagement as shown in the drawings. Any side thrust on the brake drum by reason of this action is taken up by a thrust bearing 560 between which and the hub of the brake drum is a split sleeve 562 held in position by a band 564.

The sleeve 548 carrying the brake drum 550 is journaled in uprights 566 and 568 carried by the platform 520 and, bearing against this brake drum, is a brake shoe 570 (Fig. 3) tiltable on a rigid arm 574 which is pivoted between lugs 576 on the platform by a pin 578 and has bolted to it a slightly flexible flat bar 580 the free end of which is provided with a roll 582 resting against the periphery of a cam 584. This cam is secured to a countershaft 586 (Fig. 2) journaled on the platform and driven from the shaft 544 by miter gears 588. The design of this brake mechanism and of the cam 584 enables it to exactly duplicate the resistance and inertia offered by the ramming rolls 50 and the intermediate mechanism together with the added inertia when the rolls are in engagement with the round of ammunition 42, 44. This will be the condition existing during the engagement of the concentric portion 590 (Fig. 3) of the cam 584 with the brake-operating mechanism but, as the cam is rotated to bring the hump 592 thereon beneath the cam roll 582, it will apply a severe braking force sufficient to stall the clutch shaft 172 of the control box and imitate the stalling effected in the operation of the gun when the shell strikes the fuse jaws and is stopped thereby. Following this, the cam 584 will turn to the position illustrated in Fig. 3, where the roll 582 will be received in a depression 594 and the brake completely relieved during the period corresponding to recoil and counterrecoil, whereupon, as the clutch parts 41' and 43 reengage, a load braking force will be applied by the concentric portion 590.

Figure 1:
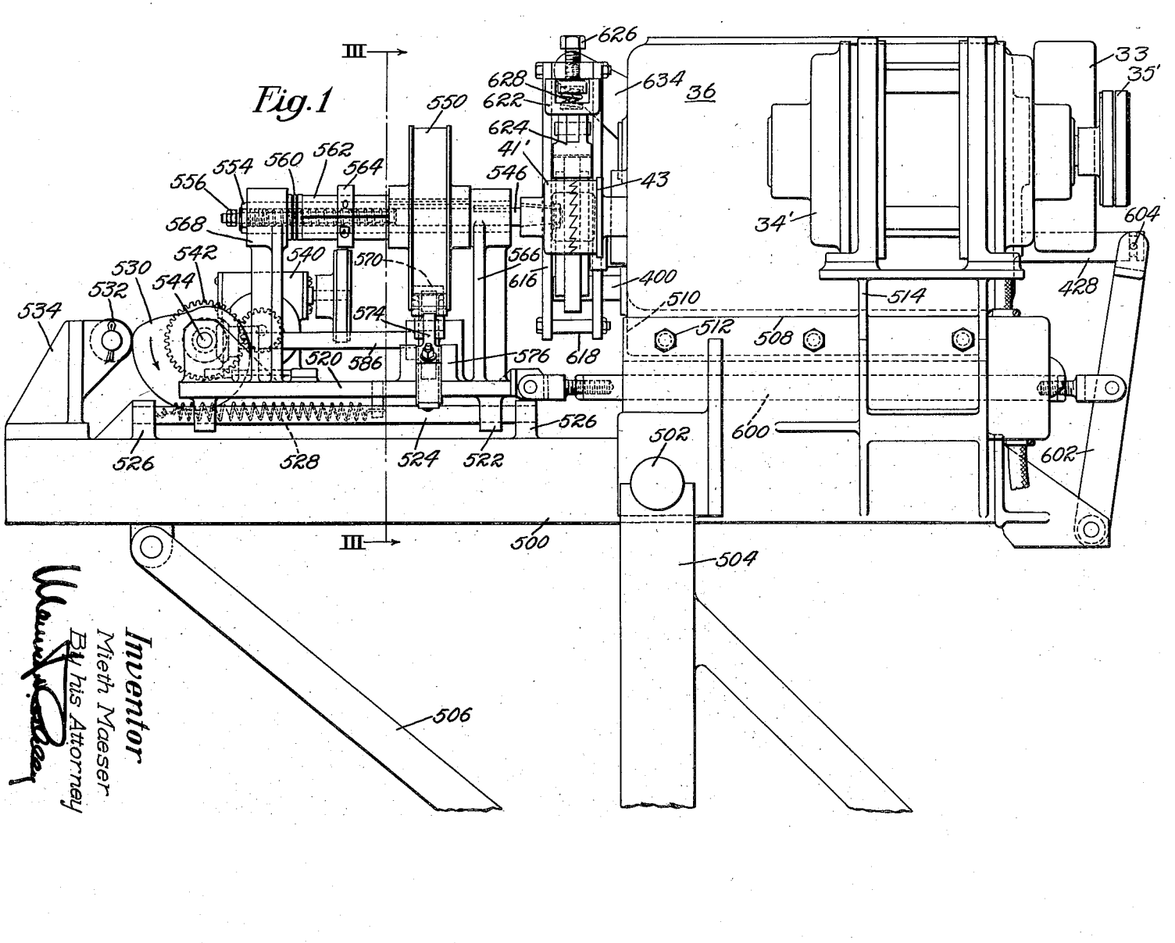
Fig. 1 is a side elevation of a testing device in which the present invention is embodied, showing a control box mounted thereon.

As the movement of recoil is simulated by the action of the cam 530 just beyond the position of that cam illustrated in Fig. 1 and this platform is moved to the left by the action of the spring 528, it will draw with it a connecting rod 600 joined to a lever 602 pivoted on the table 500 and forked at its upper end. The forked end is provided with inwardly extending pins 604 which are positioned to engage a groove in the end of the counter-recoil-buffer rod 428. Thus, the simulated recoil movement of the platform 520 is accompanied by a movement of the rod 428 to actuate the cam 424 so as to reset the escapement pendulum by an engagement with a roll 360 (Fig. 7) at the bottom of that pendulum.

Another brake mechanism provides a load for the fuse-setter shaft 240 to thus test that mechanism and especially to run in the wrap-around spring clutch 224 included in it. This is of the Prony-brake type and includes a drum 610 (Fig. 3) having a central sleeve 612 which is internally grooved for engagement with the ribbed coupling 38 of the control box. On the hub 614 of the drum 610, is swingably mounted a frame comprising plates 616 held together at the bottom by bolts and spacers 618 (Fig. 1) and provided at their top ends with a spacing block 620 (Fig. 2). Beneath this block and positioned by flanges for vertical movement between the side plates 616 is a U-shaped member 622 to which there is pivotally attached a brake shoe 624. The pressure of this brake may be adjustably determined by a screw 626 acting through a spring 628 (Fig. 3). The block 620 at the top of the brake mechanism has a laterally extending lug 630 to which is pivoted the forked end 631 of a rod 632 which extends through an aperture in a plate 634 fastened to the side of the control box and is provided with a spring 636 resisting tilting movement of the frame 616 which carries the brake shoe around the axis of the coupler shaft 240. A spacing sleeve 638 surrounds the rod and is interposed between the plate 634 and the forked end 631. The adjustment of the screw 626 is such that, during operation of the fuse-setter shaft, the end of the spacing sleeve 638 is drawn slightly away from the guide plate 634. If, however, there is any "grabbing" of the clutch 224 of the fuse-setter mechanism, this spring 636 safeguards the brake mechanism.

In the use of the apparatus, with the motors 34' and 536 being operated continuously, the result is that the cams 530 and 584 are operated continuously in timed relation and by their conjoint action cause a stalling force to be applied to the brake drum 550 and hence to the clutch shaft 172 of the control box. This will, in the manner described previously, then cause the operation of the fuse-setter drive and, by the release of the escapement mechanism, effect a movement of the shipper 182 to drive the feed rolls through a high-speed clutch 180. Following this, will come the action which simulates the recoil of the gun when the movement of the platform 520 will effect a reciprocation of the counter-recoil-buffer rod 428 and a resetting of the escapement mechanism, thus permitting operation of the cam 184 to move the shipper 182 so as to close the low-speed drive 178. The cycle then begins again and is repeated over and over as often as may be necessary to wear in the clutches and to obtain a thorough test of the mechanism in the control box 36.

What I claim as new and desire to secure by Letters Patent of the United States is:

1. A power-operated device for testing by trial a control mechanism which is adapted to determine the cycle of a fuse-setter rammer for a gun and which includes a power-driven rotary clutch shaft, said device comprising a rotary brake shaft adapted to be connected to the clutch shaft to rotate therewith, means for driving said connected shafts, a releasable brake for said rotary brake shaft, and a motor-operated cam operating cyclically to apply the brake with a force sufficient to stall the rotation of the brake shaft and then to release it.

2. A power-operated device for testing by recurrent trial a control mechanism having a shaft and adapted to initiate the cycle of a fuse-setter-rammer for a recoiling gun which, when it recoils, separates the fuse-setter-rammer from the control-mechanism shaft, said testing device embodying a rotatable shaft having a part for driving engagement with the aforesaid control-mechanism shaft, means for driving said shafts, driven mechanism movable bodily to periodically separate said shafts, a brake on one of the shafts, and driven means to apply said brake in predetermined timed relation to the time of reengagement.

3. A power-operated testing device for a gun-rammer control mechanism embodying a driven shaft terminating in a clutch part and arranged, when stalled, to trigger an associated mechanism, said testing device having a shaft terminating in a mating clutch part, means for driving said shafts, means for reciprocating the shaft of said testing device to separate the clutch parts, a brake on said latter shaft, and a lever operated in timed relation to said reciprocating means for applying a braking force to the shaft of the testing device to stall said driven shaft.

4. A power-operated device for testing by recurrent trial a control mechanism having a shaft terminating in a clutch part and adapted to initiate the cycle of a fuse-setter-rammer for a recoiling gun which, when it recoils, separates the fuse-setter-rammer from the control-mechanism shaft, said testing device comprising a slidably mounted platform having journaled thereon a brake shaft provided with part of a separable clutch coacting with said first clutch part, means for driving said brake shaft, a brake for said shaft, means to move the platform to separate the clutch part on the brake shaft from the co-operating member on the control shaft, and means to operate the brake in timed relation thereto.

5. A power-operated device for testing by recurrent trial a control mechanism having a shaft terminating in a clutch part and adapted to initiate the cycle of a fuse-setter-rammer for a recoiling gun which, when it recoils, separates the fuse-setter-rammer from the control-mechanism shaft, said testing device comprising a table, a platform slidably mounted on the table, a shaft journaled on the platform terminating in a clutch part for engagement with the corresponding clutch part on the control-mechanism shaft, means for driving said shafts, a brake for the shaft on the platform, periodically operating means for applying said brake, and means operated in timed relation to said brake-applying means for reciprocating the platform to separate the clutch parts.

6. A power-operated device for testing by recurrent trial a control mechanism having a shaft terminating in a clutch part and adapted to initiate the cycle of a fuse-setter-rammer for a recoiling gun which, when it recoils, separates the fuse-setter-rammer from the control-mechanism shaft, said testing device comprising a table, a platform slidably mounted on the table, a shaft journaled on the platform terminating in an axially yieldable clutch part for engagement with the corresponding clutch part on the control mechanism shaft, means for driving said shafts, a brake for the shaft on the platform, power means for applying said brake periodically, and means operated in timed relation to said brake-applying means for reciprocating the platform to separate the clutch parts.

7. A power-operated testing device for testing by recurrent trial a mechanism embodying both a driven shaft having an overriding clutch and terminating in a clutch part and also other mechanism set in operation by the action of said overriding clutch when the shaft is stalled, means for driving said shaft, said testing device comprising a cyclically operated brake for intermittently applying a braking force to the clutch part of the mechanism to be tested sufficient to stall the shaft, and a cam connected to said brake for completely relieving the brake load, and for applying an intermediate brake load.

8. A power-operated device for testing by recurrent trial a control mechanism adapted to determine the cycle of a fuse-setter-rammer for a gun, said mechanism having a clutch shaft and a shiftable rod for controlling the action of the clutch on that shaft, means for driving said clutch shaft, said testing device embodying means for intermittently applying a load to the clutch shaft, means for reciprocating the rod of the control mechanism, and driven means for operating said two means in timed relation.

9. A power-operated device for testing by recurrent trial a control mechanism having a shaft terminating in a clutch part and adapted to initiate the cycle of a fuse-setter-rammer for a recoiling gun which, when it recoils, separates the fuse-setter-rammer from the control-mechanism shaft, said testing device comprising a tiltable table for supporting a mechanism to be tested, a platform slidably mounted on the table, a brake shaft carried on said platform and having a clutch part for engagement with the corresponding clutch part on the control-mechanism shaft, a motor for driving said shafts, a power-driven cam mechanism for applying a brake to the brake shaft at intervals, and a cam-operated mechanism driven in timed relation to the first-mentioned cam mechanism for moving the platform toward and away from the mechanism to be tested to separate the clutch parts.

10. A power-operated device for testing by recurrent trial a control mechanism having a shaft terminating in a clutch part and adapted to initiate the cycle of a fuse-setter-rammer for a recoiling gun which, when it recoils, separates the fuse-setter-rammer from the control-mechanism shaft, said testing device comprising a tiltable table for supporting a control mechanism to be tested, a platform slidably mounted on the table, a brake shaft journaled on the platform and having a clutch part for engagement with the corresponding clutch part on the control-mechanism shaft, a motor for driving said shafts, a power-driven cam mechanism for applying a brake to the brake shaft at intervals, another cam-operated mechanism, driven in timed relation to the first-mentioned cam mechanism, for moving the platform toward and away from the control mechanism to separate the clutch parts, and means for connecting to that platform a longitudinally shiftable rod of the mechanism to be tested.

MIETH MAESER.

REFERENCES CITED

The following references are of record in the file of this patent:

UNITED STATES PATENTS

| Number | Name | Date |
| --- | --- | --- |
| 1,469,240 | Palmer | Oct. 2, 1923 |
| 2,004,950 | Jenkins | June 18, 1935 |
| 2,207,996 | Basquin | July 16, 1940 |
| 2,381,549 | Mabery | Aug. 7, 1945 |